(12) United States Patent
Lewis et al.

(10) Patent No.: US 9,916,077 B1
(45) Date of Patent: Mar. 13, 2018

(54) SYSTEMS AND METHODS FOR CONTROLLING NETWORK USAGE DURING CONTENT PRESENTATION

(71) Applicant: GOOGLE INC., Mountain View, CA (US)

(72) Inventors: Justin Lewis, Marina del Rey, CA (US); Ruxandra Georgiana Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 340 days.

(21) Appl. No.: 14/531,889

(22) Filed: Nov. 3, 2014

(51) Int. Cl.
| H04N 21/4147 | (2011.01) |
| G06F 3/0487 | (2013.01) |
| G06F 3/0484 | (2013.01) |
| G06F 3/16 | (2006.01) |
| H04N 21/234 | (2011.01) |

(52) U.S. Cl.
CPC ........ *G06F 3/0487* (2013.01); *G06F 3/04842* (2013.01); *G06F 3/165* (2013.01); *H04N 21/23424* (2013.01); *H04N 21/4147* (2013.01)

(58) Field of Classification Search
CPC .......... H04N 21/23424; H04N 21/4147; G06F 3/0487; G06F 3/04842; G06F 3/165
See application file for complete search history.

(56) References Cited

U.S. PATENT DOCUMENTS

| 6,088,064 | A * | 7/2000 | Rumreich | H04N 5/45 348/468 |
| 8,290,351 | B2 | 10/2012 | Plotnick et al. | |
| 8,774,609 | B2 * | 7/2014 | Drake | G11B 27/005 348/565 |
| 2007/0192692 | A1 * | 8/2007 | Chen | G06F 3/0488 715/702 |
| 2008/0304809 | A1 * | 12/2008 | Haberman | H04N 7/165 386/343 |
| 2009/0222850 | A1 | 9/2009 | Darnell | |
| 2009/0317053 | A1 * | 12/2009 | Morley | H04N 5/783 386/343 |
| 2010/0150522 | A1 * | 6/2010 | Schmehl | H04N 5/44513 386/343 |
| 2011/0219400 | A1 | 9/2011 | Candelore et al. | |
| 2011/0255840 | A1 * | 10/2011 | Bornsen | H04N 5/775 386/239 |
| 2012/0141088 | A1 * | 6/2012 | Isozu | G11B 27/005 386/230 |

(Continued)

Primary Examiner — William Bashore
Assistant Examiner — Daniel Parcher
(74) Attorney, Agent, or Firm — Foley & Lardner LLP

(57) ABSTRACT

A user computing device for content presentation to a user is provided. The user computing device includes an interactive surface including an input device and a display device. The display device is configured to provide content presentation to the user. The input device is configured to generate an indication of a gesture when performed by the user. The user computing device also includes at least one processor configured to display a first content item to the user through the display device. The at least one processor is also configured to receive an indication of a continuous gesture made by the user using the input device during the display of the first content item. The at least one processor is also configured to alter the display of the first content item based at least in part on the indication of the continuous gesture.

14 Claims, 7 Drawing Sheets

(56) References Cited

U.S. PATENT DOCUMENTS

2013/0046641 A1\* 2/2013 DeVree .............. G06Q 30/0277
　　　　　　　　　　　　　　　　　　　　　　　705/14.69
2014/0119709 A1　　5/2014 Sardera
2014/0317653 A1\* 10/2014 Mlodzinski .......... H04N 21/812
　　　　　　　　　　　　　　　　　　　　　　　725/32
2015/0370455 A1\* 12/2015 Van Os ............... G06F 3/04842
　　　　　　　　　　　　　　　　　　　　　　　345/173

\* cited by examiner

SYSTEMS AND METHODS FOR CONTROLLING NETWORK USAGE DURING CONTENT PRESENTATION

BACKGROUND

This specification relates to presenting online content to a user and, more particularly, to a system and method for controlling network usage associated with the serving of online content to the user.

Internet users and other consumers of online content are presented with publications such as a news article on a publisher's a web page. This primary content may also be presented alongside one or more online content items such as online advertisements. In some known systems, users may view online content items for different durations of time before, for example, navigating away from the online content items. As such, less than all of the content item may be viewed, or "consumed," by the user.

BRIEF DESCRIPTION OF THE DISCLOSURE

In one aspect, a user computing device for content presentation to a user is provided. The user computing device includes an interactive surface including an input device and a display device. The display device is configured to provide content presentation to the user. The input device is configured to generate an indication of a gesture when performed by the user. The user computing device also includes at least one processor configured to display a first content item to the user through the display device. The at least one processor is also configured to receive an indication of a continuous gesture made by the user using the input device during the display of the first content item. The at least one processor is also configured to alter the display of the first content item based at least in part on the indication of the continuous gesture.

In another aspect, a computer-implemented method for controlling network usage associated with content presentation to a user is provided. The method uses a computing device including a processor, a display device, and an input device. The method includes displaying a first content item to the user through the display device. The method also includes receiving an indication of a continuous gesture made by the user using the input device during the display of the first content item. The method further includes altering the display of the first content item based at least in part on the indication of the continuous gesture.

In yet another aspect, computer-readable storage media having computer-executable instructions embodied thereon is provided. When executed by at least one processor, the computer-executable instructions cause the processor to display a first content item to a user through a display device. The computer-executable instructions also cause the processor to receive an indication of a continuous gesture made by the user using an input device during the display of the first content item. The computer-executable instructions further cause the processor to alter the display of the first content item based at least in part on the indication of the continuous gesture.

BRIEF DESCRIPTION OF THE DRAWINGS

FIG. 1 is a diagram showing an example networked environment for providing enhanced network usage during presentation of content items to users.

FIG. 2 is a block diagram of a computing device that may be used as a part of the presentation system described herein to provide enhanced network usage during presentation of content items to users.

FIG. 3 is a diagram of an example presentation system and environment in which content items are presented to a user.

FIG. 4 is a diagram of another embodiment of presentation system and environment in which content items are presented to a user.

FIG. 5 illustrates several example embodiments of visual output displays associated with a press-and-hold gesture and a button.

FIG. 6 is an example method for serving online content that enables network acceleration of content presentation.

FIG. 7 shows an example configuration of a database within a computing device, along with other related computing components, that may be used for serving online content that enables network acceleration of content presentation.

Like reference numbers and designations in the various drawings indicate like elements.

DETAILED DESCRIPTION OF THE DISCLOSURE

Figure 1:
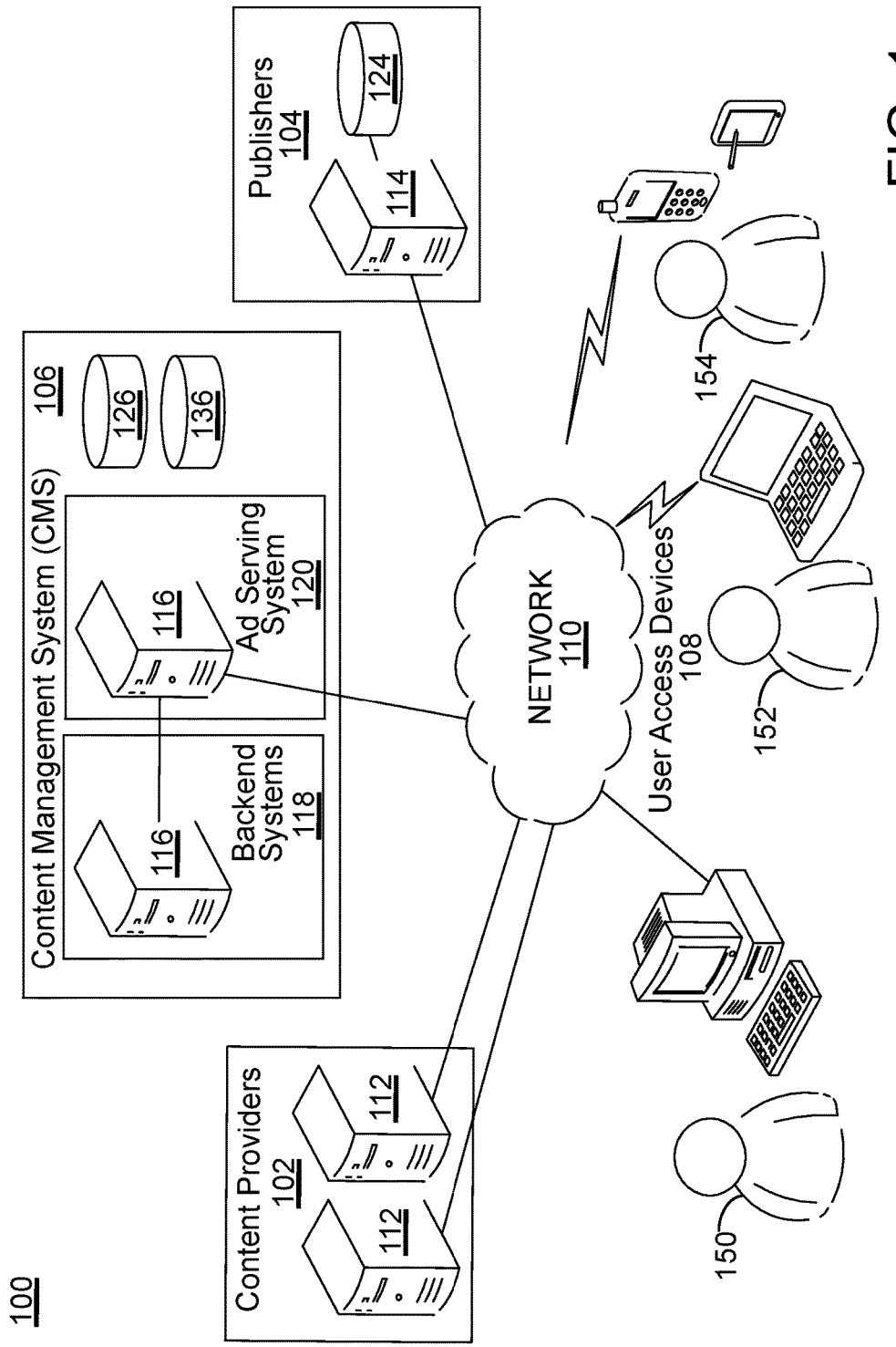
FIGS. 1-7 show example embodiments of the methods and systems described herein.

Embodiments of the methods and systems described herein provide enhanced network usage during presentation of content items to users. A presentation system presents a content item (e.g., shows a video advertisement, also known as an "ad") to a user via a display of a user computing device (e.g., a display screen of a smartphone or tablet). During presentation of the ad, the presentation system enables the user to input a gesture mechanic into the user device (i.e., an action or "gesture" that may be performed through an input interface of the computing device, such as a touch screen of the smartphone or tablet). The presentation system is configured to recognize when the gesture mechanic is performed by the user during the presentation. When the user performs the gesture, the presentation system is configured to alter the presentation of the ad.

In one example embodiment, the gesture mechanic is a "press-and-hold" gesture. The presentation system may, for example, present a virtual button within a display frame on the display of the computing device, such as a touch screen. When the user presses and holds the button, the presentation system alters the presentation of the ad. In one embodiment, the presentation system alters the presentation of the ad by presenting an accelerated presentation of the ad (e.g., "fast-forwarding" at twice the normal speed), enabling the user to move quickly through a portion of the ad. However, the system also enables an advertiser to identify a key segment or "delivery point" of the ad (e.g., a portion of the ad containing the important "brand message" of the ad) that the user may not accelerate through. For example, during the gesture, the presentation system may display one portion of the ad (an "unprotected portion" of the ad) at twice normal speed, but upon reaching the key segment, the presentation system may then display the key segment at normal speed (e.g., regardless of whether or not the user continues to perform the gesture). Once presentation of the key segment is completed at normal speed, the presentation system may skip the remainder of the ad, or may continue presentation of the ad at twice normal speed. As such, the presentation of the key segment of the ad is presented to the user at normal speed, thereby delivering the key message of the ad to the user.

In some embodiments, the presentation system presents an alternate ad when the gesture is performed by the user. In other words, the presentation system alters the presentation of the ad by presenting a different or "alternate ad" (e.g., a shortened or abbreviated version). For example, the advertiser may develop and provide an accelerated ad that is a shortened version of the "full version ad." In one embodiment, the alternate ad may be tailored to simulate an accelerated version of the full version ad but, for example, may be carefully tailored such that particular images are shown during fast forwarding, which enables the advertiser to control the images and audio presented during the altered presentation rather than merely displaying the full version ad at accelerated speed. In another embodiment, the alternate ad may include only a key message. In some embodiments, the key message in the alternate ad may be different than the key message in the full version ad. During presentation of the full version ad, when the user performs the gesture, the presentation system stops presenting the full version ad and, instead, begins displaying the alternate ad. As such, the brand message is still delivered to the user by the alternate ad.

In some embodiments, other gesture mechanics are performed to engage the presentation alterations. For example, the press-and-hold gesture may also be coupled with the display of a brand logo near the area where the gesture is made by the user, and/or a progress bar may be displayed while the gesture is made. Further, in some presentation environments such as live streaming (audio and/or video), the presentation system may provide a picture-in-picture presentation of, for example, both a live stream video program and a full version video ad (e.g., where a majority of the display screen is occupied or utilized to present the ad and a minority area of the display screen is utilized to provide continued presentation of the live stream). As such, the presentation system may provide gesture mechanics and presentation alterations associated with the picture-in-picture presentation environment.

At least one of the technical problems addressed by this system includes: (i) network transmission of complete online content items that do not get completely viewed by a user because the user would otherwise skip some or all of the content item (e.g., ads); (ii) the skipping of content items by users before delivery of an important brand message; and (iii) interruption of live stream content items with other content items. Other technical problems addressed by the system and methods described herein may include increased network usage (slowing down the network) due to the over-serving of online content items that may be only partially consumed by consuming users.

The methods and systems described herein may be implemented using computer programming or engineering techniques including computer software, firmware, hardware, or any combination or subset thereof, wherein the technical effects may be achieved by performing at least one of the following steps: (a) displaying a first content item to the user through the display device; (b) receiving an indication of a continuous gesture made by the user using the input device during the display of the first content item; (c) altering the display of the first content item based at least in part on the indication of the continuous gesture; (d) displaying a first portion of the first content item at a speed greater than a normal speed while the continuous gesture is made by the user; (e) displaying a second portion of the first content item at the normal speed regardless of whether or not the continuous gesture continues to be made by the user; (f) halting display of the first content item upon receiving indication of the continuous gesture; (g) displaying a second content item instead of the first content item while the continuous gesture is made by the user; (h) displaying a progress bar during the continuous gesture for a pre-determined amount of time; (i) altering the pre-determined amount of time of the continuous gesture has elapsed, halt the display the first content item; (j) displaying a button to the user through the display device, wherein the continuous gesture includes the user pressing and holding the button; (k) displaying a primary content item simultaneously with display of the first content item, wherein the first content item is contained within a first display area on the display device and the primary content item is contained in a second display area within the first display area; (l) the primary content item includes a first audio aspect, the first content item includes a second audio aspect, and altering the display of the first content item further includes muting one of the first audio aspect and the second audio aspect during the continuous gesture; (m) providing subtitle text of the muted one of the first audio aspect and the second audio aspect during the continuous gesture.

The resulting technical effect achieved by this system is at least one of: (i) accelerating network presentation of content items by reducing the amount of network traffic required to deliver online content items to the user's device; (ii) providing an accelerated viewing option for users that still delivers a key brand message; and (iii) providing an accelerated viewing option for live stream environments that limits the interference of the additional content with the live stream content. Thus, the system is better able to serve relevant online content items to users in an accelerated fashion, which results in a better user experience with the network and reduces the amount of only partially consumed content items such that the overall speed of the network is improved.

The following detailed description illustrates embodiments of the disclosure by way of example and not by way of limitation. It is contemplated that the disclosure has general application to the presentation and valuation of content items such as online advertisements during presentation of publications such as online web pages.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

FIG. 1 is a diagram showing an example networked environment 100 for providing enhanced network usage during presentation of content items to users. With reference to FIG. 1, an example networked environment 100 may include one or more content providers 102 (alternatively referred to herein as merchants), one or more publishers 104, a content management system (CMS) 106, and one or more user access devices 108 ("client computing devices" or just "client devices"), which may be coupled to a network 110. User access devices are used by users 150, 152, and 154. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with servers, software processes and engines, and/or various embedded systems. The elements 102, 104, 106 and 110 may serve, for example, as a content bidding and distribution network. In the example embodiment, content providers 102 include online advertisers, and CMS 106 is an advertising management system that enables network acceleration of content presentation in conjunction with user devices 108 as described herein.

The content providers 102 may include any entities that are associated with content (i.e., a content item or multiple content items). In some embodiments, the content includes any form of communication in which one or more products, services, ideas, messages, people, organizations or other items are identified and promoted (or otherwise communicated). Content is not limited to advertisements and commercial promotions. Rather, content may include public service announcements or any other types of notices, such as public notices published in printed or electronic press or broadcasts. In some embodiments, content providers 102 provide content items that include, for example, audio and/or video advertisements.

Content may be communicated via various mediums and in various forms. In some examples, content may be communicated through an interactive medium, such as the Internet, and may include graphical content (e.g., banner content), textual content, image content, audio content, video content, content combining one of more of any of such components, or any form of electronically delivered content. Content may include embedded information, such as embedded media, links, meta-information, and/or machine executable instructions. Content could also be communicated through RSS (Really Simple Syndication) feeds, radio channels, television channels, print media, and other media.

Content can refer to both a single "creative" and a "content group." A creative refers to any entity that represents one content impression, also referred to herein as an advertisement, or "ad." A content impression refers to any form of presentation of content such that it is viewable/receivable by a user. In some examples, a content impression may occur when content is displayed on a display device of a user access device (i.e., a "client computing device"). A content group refers, for example, to an entity that represents a group of creatives that share a common characteristic, such as having the same content selection and recommendation criteria. Content groups can be used to create a content campaign.

In some embodiments, one or more ads are affiliated with an "ad group." An ad group includes one or more ads along with other associated information related to those ads, such as, for example and without limitation, a title, a headline, a budget, targeting criteria, and keywords. In the example embodiment, an ad group includes one ad and associated information. As used herein, the term "ad" and "ad group" may be used interchangeably, as some operations that are performed relative to an ad may also be performed relative to an ad group, and vice versa.

The content providers 102 may provide (or be otherwise associated with) products and/or services related to content. The content providers 102 may include or be associated with, for example, retailers, wholesalers, warehouses, manufacturers, distributors, health care providers, educational establishments, financial establishments, technology providers, energy providers, utility providers, or any other product or service providers or distributors.

The content providers 102 may directly or indirectly generate, maintain, review, and/or analyze content, which may be related to products or services offered by or otherwise associated with the content providers 102. The content providers 102 may include or maintain one or more data processing systems 112, such as servers or embedded systems, coupled to the network 110. The content providers 102 may include or maintain one or more processes that run on one or more data processing systems. In some embodiment, some content providers 102 review online content items using, for example, systems 112 and/or CMS 106.

The publishers 104 may include any entities that generate, maintain, provide, present and/or otherwise process publications in the environment 100. "Publishers," in particular, include authors of publications, wherein authors may be individual persons, or, in the case of works made for hire, the proprietor(s) who hired the individual(s) responsible for creating the online publications. The term "publication" refers to various types of web-based, software application-based and/or otherwise presented information, including articles, discussion threads, reports, analyses, financial statements, music, video, graphics, search results, web page listings, information feeds (e.g., RSS feeds), television broadcasts, radio broadcasts, printed information, or any other form of information that may be presented to a user using a computing device such as one of user access devices 108.

In some implementations, the publishers 104 may include publishers with an Internet presence, such as online publication and news providers (e.g., online newspapers, online magazines, television websites, etc.), online service providers (e.g., financial service providers, health service providers, etc.), and the like. The publishers 104 can include software application providers, television broadcasters, radio broadcasters, satellite broadcasters, and other providers of publications. One or more of the publishers 104 may represent a publication network that is associated with the CMS 106.

The publishers 104 may receive requests from the user access devices 108 (or other elements in the environment 100) and provide or present publications to the requesting devices. The publishers may provide or present publications via various mediums and in various forms, including web based and non-web based mediums and forms. The publishers 104 may generate and/or maintain such publications and/or retrieve the publications from other network resources.

In addition to publications, the publishers 104 may be configured to integrate or combine retrieved publications with content that is related or relevant to the retrieved publication for display to users 150, 152, and 154. The relevant content may be provided from the CMS 106 and may be combined with a publication for display to users 150, 152, and 154. In some examples, the publishers 104 may retrieve a publication for display on a particular user access device 108 and then forward the publication to the user access device 108 along with code that causes content from the CMS 106 to be displayed to the user 150, 152, or 154. In other examples, the publishers 104 may retrieve a publication, retrieve relevant content (e.g., from the CMS 106 or the content providers 102), and then integrate the content and the publication to form a page for display to the user 150, 152, or 154. In still other examples, the publishers 104 may provide online content space for sale to advertisers, such as content providers 102. Such content space may be populated with content items from the content providers 102, and may be presented to the user 150, 152, or 154 along with the publications.

As noted above, one or more of the publishers 104 may represent a publication network. In such an implementation, the content providers 102 may be able to present content to users through this publication network. Further, in some embodiments, content providers 102 bid on online content items, for example, through CMS 106.

The publishers 104 may include or maintain one or more data processing systems 114, such as servers or embedded systems, coupled to the network 110. They may include or maintain one or more processes that run on data processing systems. In some examples, the publishers 104 may include one or more publication repositories 124 for storing publications and other information. Additionally, in some embodiments, publishers 104 and/or content providers 102 may review online content items using, for example, system 114 and/or CMS 106.

The CMS 106 manages content and provides various services to the content providers 102, the publishers 104, and the user access devices 108. The CMS 106 may store content in a content repository 126 and facilitate the distribution or selective provision and recommendation of content through the environment 100 to the user access devices 108.

The CMS 106 may include one or more data processing systems 116, such as servers or embedded systems, coupled to the network 110. It can also include one or more processes, such as server processes. In some examples, the CMS 106 may include a content serving system 120 and one or more backend systems 118. The content serving system 120 may include one or more data processing systems 116 and may perform functionality associated with delivering content to publishers or user access devices 108. The backend system 118 may include one or more data processing systems 116 and may perform functionality associated with identifying relevant content to deliver, processing various rules, performing filtering processes, generating reports, maintaining accounts and usage information, auctioning online content items, and other backend system processing. The CMS 106 can use the backend system 118 and the content serving system 120 to selectively recommend and provide relevant content from the content providers 102 through the publishers 104 to the user access devices 108.

The CMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publications, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query. Searching modules may also store search results including one or more of search query terms, search results elements, and ads impressions served.

The CMS 106 may include one or more interface or frontend modules for providing the various features to content providers, publishers, and user access devices. For example, the CMS 106 may provide one or more publisher front-end interfaces (PFEs) for allowing publishers to interact with the CMS 106. The CMS 106 may also provide one or more content provider front-end interfaces (CPFEs) for allowing content providers to interact with the CMS 106. In some examples, the front-end interfaces may be configured as web applications that provide users with network access to features available in the CMS 106.

The CMS 106 provides various content management features to the content providers 102. The CMS 106 features may allow users to set up user accounts, set account preferences, create content, select keywords for content, create campaigns or initiatives for multiple products or businesses, view reports associated with accounts, analyze costs and return on investment, selectively identify customers in different regions, selectively recommend and provide content to particular publishers, analyze financial information, analyze content performance, estimate content traffic, access keyword tools, add graphics and animations to content, and review content items as described herein.

The CMS 106 may allow the content providers 102 to create content and input keywords for which the content will appear. In some examples, the CMS 106 may provide content to user access devices or publishers when keywords associated with that content are included in a user request or a requested publication. The CMS 106 may also allow the content providers 102 to set bids for content. A bid may represent the maximum amount a content provider is willing to pay for each content impression, user click-through of content or other interaction with content. A click-through can include any action a user takes to select content. The content providers 102 may also choose a currency and monthly budget.

The CMS 106 may also allow the content providers 102 to view information about content impressions, which may be maintained by the CMS 106. The CMS 106 may be configured to determine and maintain the number of content impressions relative to a particular website or keyword. The CMS 106 may also determine and maintain the number of click-trough's for content as well as the ratio of click-trough's to impressions.

The CMS 106 may also allow the content providers 102 to select and/or create conversion types for content. A "conversion" may occur when a user consummates a transaction related to given content. A conversion could be defined to occur when a user clicks on content, for example a specific content item, is referred to the content provider's web page, and consummates a purchase there before leaving that web page. In another example, a conversion could be defined as the display of content to a user and a corresponding purchase on the content provider's web page within a predetermined time (e.g., seven days). The CMS 106 may store conversion data and other information in a conversion data repository 136.

The CMS 106 may allow the content providers 102 to input description information associated with content. This information could be used to assist the publishers 104 in determining content to publish. The content providers 102 may additionally input a cost/value associated with selected conversion types, such as a five dollar credit to the publishers 104 for each product or service purchased.

The CMS 106 may provide various features to the publishers 104. The CMS 106 may deliver content (associated with the content providers 102) to the user access devices 108 when users access publications from the publishers 104. The CMS 106 can be configured to deliver content that is relevant to publisher sites, publications, and publisher audiences.

In some examples, the CMS 106 may crawl publications provided by the publishers 104 and deliver content that is relevant to publisher sites, publications and publisher audiences based on the crawled publications. The CMS 106 may also selectively recommend and/or provide content based on user information and behavior, such as particular search queries performed on a search engine website. In some examples, the CMS 106 can add search to a publisher site and deliver content configured to provide appropriate and relevant content relative to search results generated by requests from visitors of the publisher site. A combination of these and other approaches can be used to deliver relevant content.

The CMS 106 may allow the publishers 104 to search and select specific products and services as well as associated content to be displayed with publications provided by the publishers 104. For example, the publishers 104 may search through content in the content repository 126 and select certain content for display with their publications.

The CMS 106 may be configured to selectively recommend and provide content created by the content providers 102 to the user access devices 108 directly or through the publishers 104. The CMS 106 may selectively recommend and provide content to a particular publisher 104 (as described in further detail herein) or a requesting user access device 108 when a user requests search results or loads a publication from the publisher 104.

In some implementations, the CMS 106 may manage and process financial transactions among and between elements in the environment 100. For example, the CMS 106 may credit accounts associated with the publishers 104 and debit accounts of the content providers 102. These and other transactions may be based on conversion data, impressions information and/or click-through rates received and maintained by the CMS 106.

"Computing devices", for example user access devices 108, may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed content providers 102, publishers 104 and/or user access devices 108, which may be discrete, integrated modules or distributed systems. Similarly, the environment 100 is not limited to a single CMS 106 and may include any number of integrated or distributed CMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes running on separate machines or a single process running on a single machine.

In some embodiments, the CMS 106 and/or user devices 108 act as a presentation system for providing and/or displaying online content items to users 150, 152, 154. For example, in one embodiment, in addition to other services, CMS 106 also acts as the presentation system for online content items displayed to user 154 on a user access computing device 108 such as a tablet or a smartphone. User 154 may, for example, be consuming video-based online content items via a web browser or other video display application. Before or during the viewing, CMS 106 may provide some content items (e.g., advertisements) to computing device 108 for presentation to user 154. The presentation system described herein provides a gesture mechanic that user 154 may execute (e.g., via the touch screen of tablet computing device 108) which, when performed, causes the presentation system to alter the presentation of the advertisement. Gesture mechanics and the presentation alterations of online content items are described below in greater detail with respect to FIG. 3.

Figure 2:
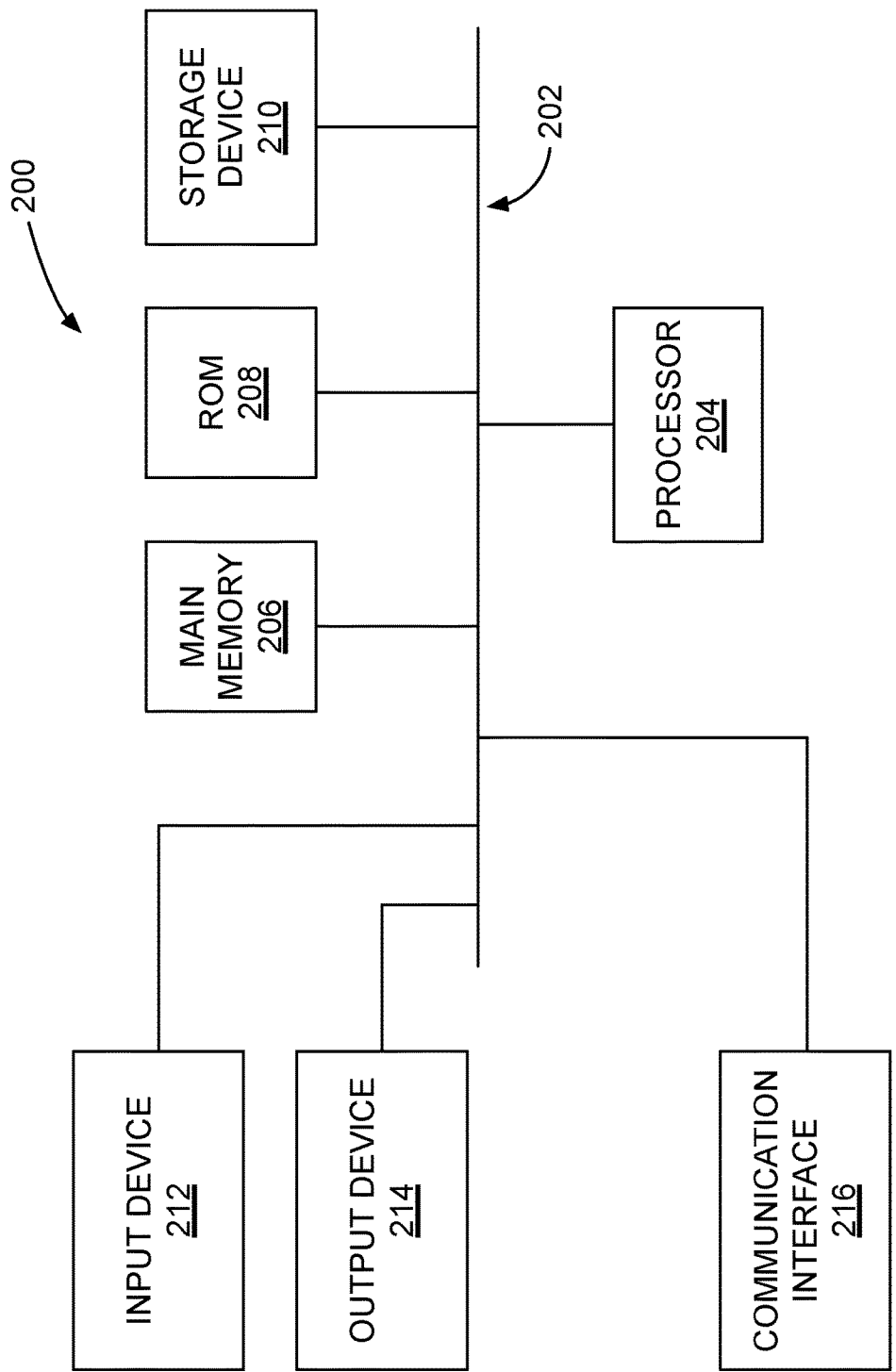

FIG. 2 is a block diagram of a computing device 200 that may be used as a part of the presentation system described herein to provide enhanced network usage during presentation of content items to users. In the example embodiment, computing device could be any of the computing devices shown in FIG. 1, such as, for example, user access device 108, backend system 118, or CMS 106. FIG. 2 shows an example of a computing device 200 intended to represent various forms of digital computers, such as laptops, desktops, workstations, personal digital assistants, servers, blade servers, mainframes, and other appropriate computers. Computing device 200 is also intended to represent various forms of mobile devices, such as personal digital assistants, cellular telephones, smart phones, tablet computers, digital e-book readers, and other similar computing devices that could be used for displaying publications and/or content items to a user. The components shown here, their connections and relationships, and their functions, are meant to be examples only, and are not meant to limit implementations of the subject matter described and/or claimed in this document.

In the example embodiment, computing device 200 could be user access device 108 or any of data processing devices 112, 114, or 116 (shown in FIG. 2), wherein it is specifically configured to perform one or more of the steps described herein. In the example embodiment, computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of conventional processor, microprocessor, or processing logic that interprets and executes instructions. Processor 204 can process instructions for execution within the computing device 200, including instructions stored in the memory 206 or on the storage device 210 to display graphical information for a GUI on an external input/output device, such as display 214 coupled to a high speed interface. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system). In some embodiments, processor 204 is transformed into a special purpose microprocessor by executing computer-executable instructions or by otherwise being programmed.

Main memory 206 may include a random access memory (RAM) or another type of dynamic storage device that stores information and instructions for execution by processor 204. ROM 208 may include a conventional ROM device or another type of static storage device that stores static information and instructions for use by processor 204. Main memory 206 stores information within the computing device 200. In one implementation, main memory 206 is a volatile memory unit or units. In another implementation, main memory 206 is a non-volatile memory unit or units. Main memory 206 may also be another form of computer-readable medium, such as a magnetic or optical disk.

Storage device 210 may include a magnetic and/or optical recording medium and its corresponding drive. The storage device 210 is capable of providing mass storage for the computing device 200. In one implementation, the storage device 210 may be or contain a computer-readable medium, such as a floppy disk device, a hard disk device, an optical disk device, or a tape device, a flash memory or other similar solid state memory device, or an array of devices, including devices in a storage area network or cloud-based storage or other configurations. A computer program product can be tangibly embodied in an information carrier. The computer program product may also contain instructions that, when executed, perform one or more methods, such as those described above. The information carrier is a computer- or machine-readable medium, such as main memory 206, ROM 208, the storage device 210, or memory on processor 204.

The high speed controller manages bandwidth-intensive operations for the computing device 200, while the low speed controller manages lower bandwidth-intensive operations. Such allocation of functions is for purposes of example only. In one implementation, the high-speed controller is coupled to main memory 206, display 214 (e.g., through a graphics processor or accelerator), and to high-speed expansion ports, which may accept various expansion cards (not shown). In the implementation, low-speed controller is coupled to storage device 210 and low-speed expansion port. The low-speed expansion port, which may include various communication ports (e.g., USB, BLUETOOTH, Ethernet, wireless Ethernet) may be coupled to one or more input/output devices, such as a keyboard, a pointing device, a scanner, or a networking device such as a switch or router, e.g., through a network adapter.

Input device 212 may include a conventional mechanism that permits computing device 200 to receive commands, instructions, or other inputs from a user 150, 152, or 154, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communicating with another device or system via a network, such as network 110 (shown in FIG. 1).

As described herein, computing device 200 is configured to facilitate enhanced network usage during presentation of content items to users. Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

The computing device 200 may be implemented in a number of different forms, as shown in the figure. For example, it may be implemented as a standard server, or multiple times in a group of such servers. It may also be implemented as part of a rack server system. In addition, it may be implemented in a personal computer such as a laptop computer. Each of such devices may contain one or more of computing device 200, and an entire system may be made up of multiple computing devices 200 communicating with each other.

The processor 204 can execute instructions within the computing device 200, including instructions stored in the main memory 206. The processor may be implemented as chips that include separate and multiple analog and digital processors. The processor may provide, for example, for coordination of the other components of the device 200, such as control of user interfaces, applications run by device 200, and wireless communication by device 200.

Computing device 200 includes a processor 204, main memory 206, ROM 208, an input device 212, an output device such as a display 214, a communication interface 216, among other components including, for example, a receiver and a transceiver. The device 200 may also be provided with a storage device 210, such as a microdrive or other device, to provide additional storage. Each of the components are interconnected using various buses, and several of the components may be mounted on a common motherboard or in other manners as appropriate.

Computing device 200 may communicate wirelessly through communication interface 216, which may include digital signal processing circuitry where necessary. Communication interface 216 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver. In addition, short-range communication may occur, such as using a BLUETOOTH, Wi-Fi, or other such transceiver (not shown). In addition, a GPS (Global Positioning system) receiver module may provide additional navigation- and location-related wireless data to device 200, which may be used as appropriate by applications running on device 200.

Computing device 200 may also communicate audibly using an audio codec, which may receive spoken information from a user and convert it to usable digital information. The audio codec may likewise generate audible sound for a user, such as through a speaker, e.g., in a handset of device. Such sound may include sound from voice telephone calls, may include recorded sound (e.g., voice messages, music files, etc.) and may also include sound generated by applications operating on computing device 200.

Computing device 200 may be implemented in a number of different forms. For example, it may be implemented as a cellular telephone, or as part of a smart phone, personal digital assistant, a computer tablet, or other similar mobile device.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 200) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing device 200 is a user device such as the user devices 108 shown in FIG. 1, and computing device 200 participates as a part of a presentation system to present content items to a user. Computing device 200 is configured to recognize one or more gesture mechanics performed by a user. For example, computing device 200 may be configured to display a button on output device 214 (e.g., on a tablet display), and may be configured to receive or otherwise identify a gesture mechanic that includes pressing and holding ("press-and-hold") the button on input device 212 (e.g., where the tablet display also acts as an input device). As such, when the user performs the gesture, the presentation system (e.g., in conjunction with computing device 200) is configured to alter the presentation of online content items being presented to the user.

Figure 3:
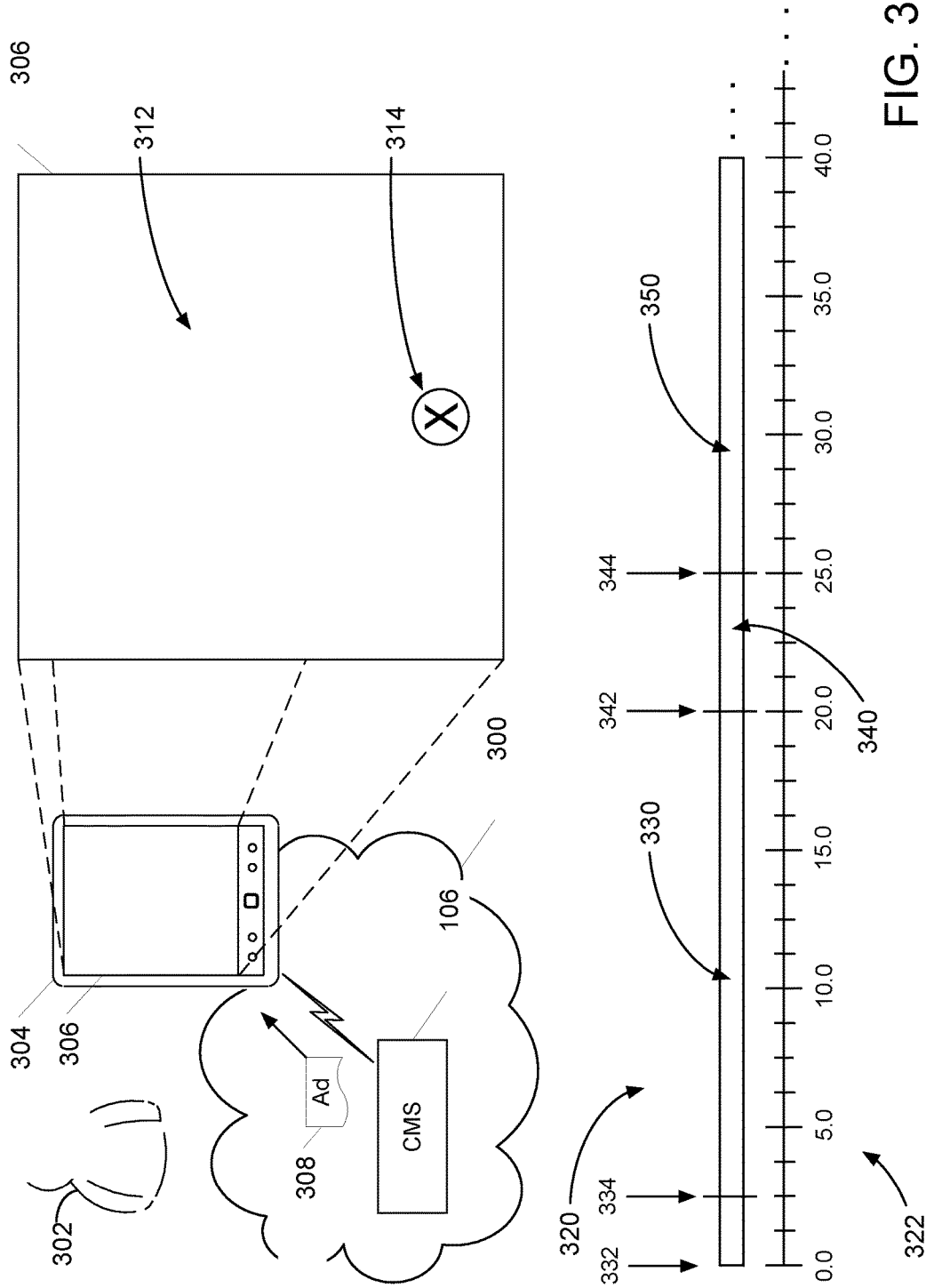

FIG. 3 is a diagram of an example presentation system 300 and environment (e.g., as shown in FIG. 1) in which content items are presented to a user 302. In the example embodiment, presentation system 300 presents online content items such as advertisements ("ads") 308 to user 302 in an environment similar to environment 100 (shown in FIG. 1). Presentation system 300 includes a content management system (CMS) 106 in communication with a user computing device 304 such as a tablet computing device or smartphone. Computing device 304, in some embodiments, is similar to user devices 108 (shown in FIG. 1). Computing device 304 includes an interaction surface 306 (e.g., a "touch screen") that is configured to act as both an output device (e.g., for display of online content items) and an input device (e.g., for interaction with computing device 304).

During operation, user 302 may, for example, be viewing video content items online, such as through an online video web site. CMS 106 provides ad 308 ("supplemental" or "additional" content items) to computing device 304 for presentation to user 302 before, during, or after presentation of one or more "primary" content items (i.e., the content items primarily desired for viewing by user 302). Computing device 304 presents (displays) the primary content items and ads 308 in display areas 312 of interaction surface 306. In the example embodiment, display area 312 is shown in a "full-screen" mode. In other words, display area 312 consumes most or all of interaction surface 306. It should be understood, however, that display area 312 may be "windowed", or otherwise only consume a portion of interaction surface 306.

During presentation of additional content items (e.g., ads 308), computing device 304 also provides a gesture mechanic to user 302. The term "gesture mechanic", as used herein, refers to a particular input action, or "gesture", that, when made, performed, conducted, or otherwise executed by user 302, causes computing device 304 to perform a particular action. In the example embodiment, the gesture mechanic is a press-and-hold mechanic that involves a button 314 displayed somewhere within interaction surface 306 (e.g., within display area 312). Computing device 304 is configured to display button 314 on interaction surface 306 during presentation of ad 308. When user 302 presses and holds button 314 (i.e., performs the gesture "press-and-hold" with button 314), computing device 304 determines that the gesture mechanic is being performed by user 302 (e.g., via an input interrupt) and subsequently alters the presentation of ad 308. In other embodiments, the gesture mechanic may be a press-and-hold mechanic not involving a button. For example, user 302 may perform the press-and-hold gesture anywhere on interaction surface 306, or anywhere within a pre-defined area of interaction surface 306, such as within a display window where ad 308 is being presented.

Referring still to FIG. 3, ad 308 is a non-static ad (e.g., an ad that is presented and/or changes over time, such as a video ad that includes video and perhaps associated audio, or an audio ad). A graphical bar ("ad bar") 320 is shown to represent and illustrate ad 308. Alongside ad bar 320 is a time line 322 that includes numerical indicia on an axis representing time, in seconds. Time line 322, in other words, is used for purposes of discussion and illustration only, for indicating various time points within ad 308 when presented under a "normal" speed (e.g., unaltered play speed based on how an advertiser originally created ad 308). As such, time line 322 is not necessarily a time line indicating actual events, or of the actual presentation of ad 308 to user 302.

In the example embodiment, ad 308 is 40.0 seconds long. Further, ad 308 includes two types of sections: un-protected sections 330, 350, and a protection section ("key segment") 340. In some embodiments, the advertiser may indicate which areas, segment, or section of an ad is particularly important, such as to deliver a "brand message" of a product or service that is the subject of the advertisement. For example, the advertiser associated with ad 308 identified key segment 340 (e.g., between the 20.0 second mark and the 25.0 second mark) as a protected section. Protected section 340 may, for example, be delimited by a beginning mark time 342 and an ending mark time 344. In other embodiments, protected section 340 may be delimited by a beginning mark time 342 and a total protected time value, such as 5.0 seconds in the example shown in FIG. 3.

During operation, presentation system 300 begins presentation of ad 308 at normal speed beginning at a start point 332 within ad 308 (i.e., the beginning of ad 308, or the 0.0 second mark). At the 2.5 second mark of ad 308, user 302 performs the gesture mechanic of push-and-hold (e.g., user 302 presses and holds button 314) at gesture beginning mark 334. Presentation system 300 recognizes the performance of the press-and-hold gesture and, as such, modifies or alters presentation of ad 308. In the example embodiment, presentation system 300 accelerates the presentation of ad 308 at the beginning of the gesture (e.g., starting at the 2.5 second mark, at the time of gesture beginning 334). In other embodiments, the rate of display is greater than normal speed. In some embodiments, the rate of display is at greater than or equal to 2.0 times normal speed.

As such, in the example embodiment, presentation system 300 accelerates the presentation of ad 308 starting at gesture beginning 334. In this embodiment, the gesture mechanic requires a continuous gesture (e.g., the "hold" portion of press-and-hold). While the gesture continues to be made (e.g., while user 302 continues to hold button 314), presentation system 300 displays ad 308 at an accelerated speed. Once protected section 340 is reached (e.g., at beginning mark time 342), presentation system 300 reduces the presentation speed of ad 308 to normal speed. In other words, presentation system 300 presents unprotected section 330 at an accelerated speed until protected section 340 is reached, then displays protected section 340 at normal speed (e.g., regardless of whether or not user 302 continues to perform the gesture). After presenting protected section 340 at normal speed, in some embodiments, presentation system 300 resumes accelerated presentation of ad 308 if user 302 continues to perform the gesture. In other embodiments, presentation system 300 may skip (e.g., not display) the remaining unprotected section 350.

As such, presentation system 300 shortens the total presentation time that user 302 views ad 308 by presenting some segments (e.g., unprotected sections 330, 350) in an accelerated mode while allowing user 302 to still view a key brand message (e.g., protected section 340) at normal speed. Among other advantages provided, presentation system 300 reduces network traffic between, for example, CMS 106 and computing device 304 by not transmitting an un-protected segment 350 of ad 308, or by transmitting only certain images of ad 308 during an accelerated viewing of un-protected segment 330.

Figure 4:
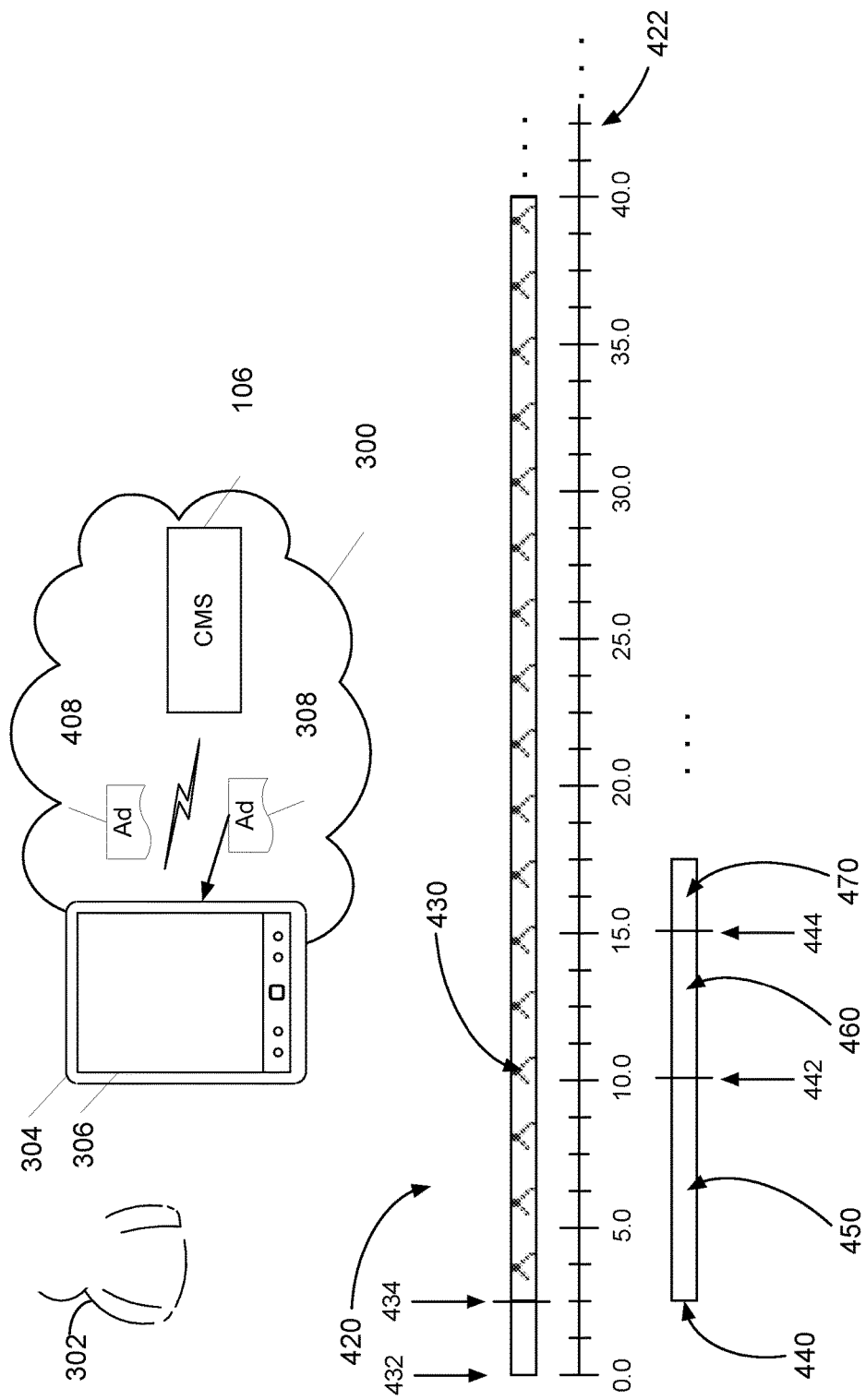

FIG. 4 is a diagram of another embodiment of presentation system 300 and environment in which content items are presented to user 302. In the example embodiment, presentation system 300 transmits a "full version" of an ad 308 (e.g., the 40-second ad shown in FIG. 3) and an "alternate ad" 408. A graphical bar ("ad bar") 420 is shown to represent and illustrate the full version ad 308. An alternate ad bar 440 is shown to represent and illustrate the alternate ad 408. Alongside ad bars 420 and 440 is a time line 422 that includes numerical indicia on an axis representing time, in seconds. Time line 422 is a time line indicating actual event times, as this embodiment does not include accelerating ad 308. As such, events are described herein in reference to a time, t, on time line 422. As shown in FIG. 4, full version ad 308 is a 40.0 second ad and alternate ad 408 is a 15.0 second ad.

In the example embodiment, presentation system 300 begins presentation of full version ad 308 at time t=0.0 seconds, indicated by start point 432. At time t=2.5 seconds, user 302 performs the press-and-hold gesture (e.g., at gesture beginning 434). In the example embodiment, presentation system 300 stops presentation of full version ad 308 at the beginning of the gesture (e.g., starting at the 2.5 second mark, at the time of gesture beginning 334) and begins presentation of alternate ad 408. In other words, an un-presented segment 430 of full version ad 308 is not presented to user 308. Rather, presentation system 300 presents alternate ad 408 is presented to user 302.

In the example embodiment, the advertiser provides a "simulated" accelerated ad as alternate ad 408. This alternate ad 408 is presented by presentation system 300 at normal speed, but alternate ad 408 is pre-designed to include one or more simulated-acceleration segments 450, 470, along with a normal-speed segment 460. In other words, during normal speed presentation of alternate ad 408, segments 450 and 570 appear, to user 302, to be full version ad 308 playing at a faster than normal speed, and then at normal speed during normal-speed segment 460 (e.g., between mark 442 at t=10.0 seconds and mark 444 at t=15.0 seconds). Some advertisers may, for example, carefully design alternate ad 408 such that particular images are presented during the presentation of simulated-acceleration segments 450, 470.

In some embodiments, alternate ad 408 is an ad that does not necessarily appear to represent full version ad 308. For example, in one embodiment, alternate ad 408 is a 5.0 second ad presenting the same brand message (e.g., from normal-speed segment 460), or a completely different brand message.

In the example embodiment, the gesture is a continuous gesture such as press-and-hold, and when user 302 ceases the gesture, presentation system 300 discontinues display of alternate ad 408 and, instead, begins display of full version ad 308. Presentation system 300 may, for example, determine a re-start mark within full version ad 308 based on how much (e.g., a percentage) of alternate ad 408 user 302 viewed before ceasing the gesture. In some embodiments, full version ad 308 includes a protected segment such as protected segment 340 (shown in FIG. 3), and presentation system 300 determines a re-start mark while ensuring that the protected segment is not skipped (e.g., if the protected segment was not viewed during presentation of alternate ad 408, then re-start mark will be prior to the protected segment within full version ad 308 such that user 302 will not miss the brand message.

Figure 5:
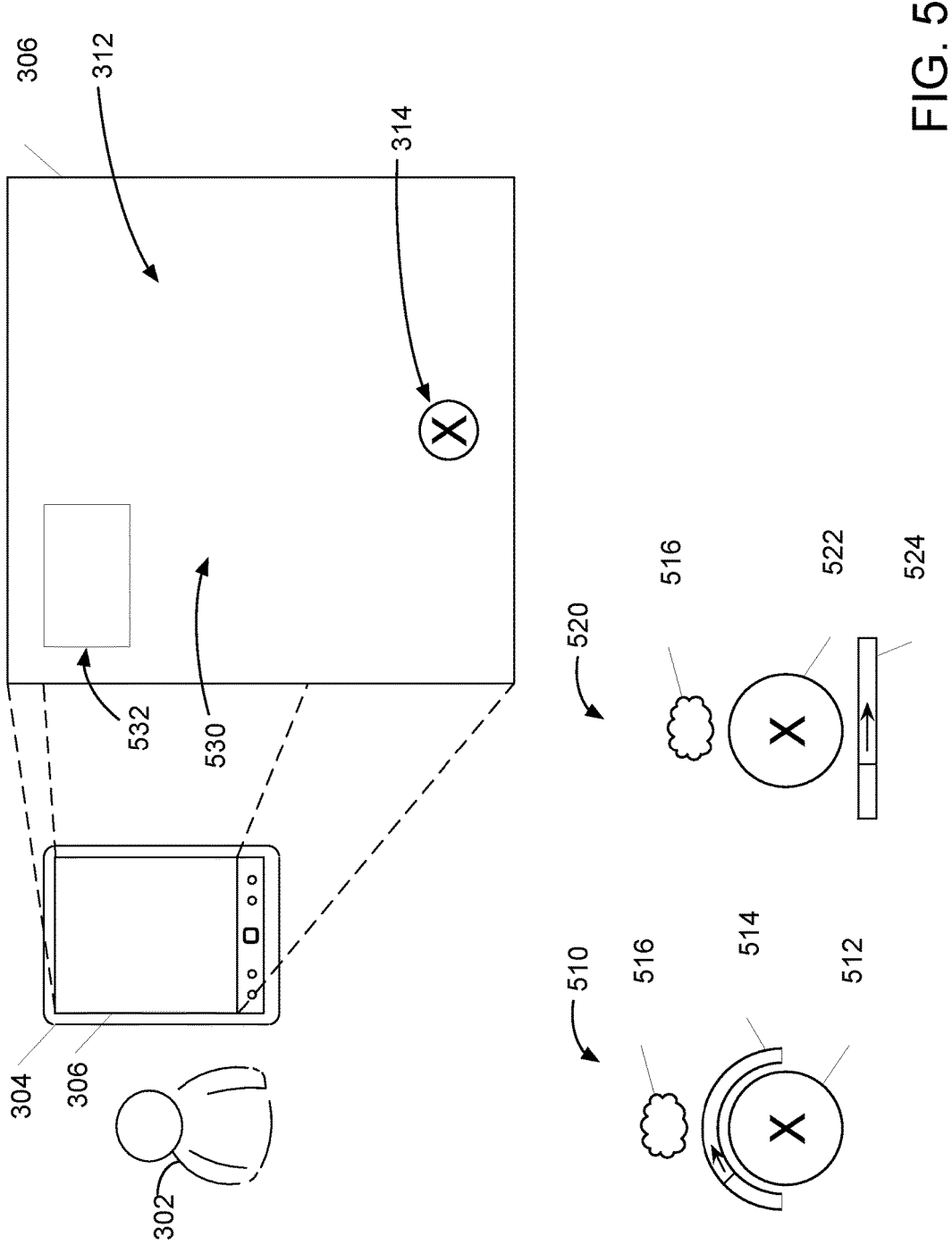

FIG. 5 illustrates several example embodiments of visual output displays associated with a press-and-hold gesture and button 314. In some embodiments, a visual queue 510 or 520 is displayed (e.g., on interaction surface 306) when user 302 performs a configured continuous gesture, such as press-and-hold. Visual queue 510 includes a button 512 (e.g., similar to button 314) and a progress bar 514. Visual queue 520 includes a button 522 (e.g., similar to button 314) and a progress bar 524. Buttons 512, 522 may or may not be displayed while the gesture is not performed, but when the press-and-hold gesture is performed, presentation system 300 provides a button 512, 522 and/or a progress bar 514, 524.

In the example embodiment, progress bar 514, 524 fills in while user 302 performs the gesture (e.g., while button 512, 522 is held). In some embodiments, progress bar 514, 524 includes a pre-determined "time to fill," such as 5 seconds. This pre-determined time to fill may be associated with each particular ad (e.g., provided by the advertiser), or may be defined by another aspect of presentation system 300 (e.g., a default time to fill). In some embodiments, upon beginning the gesture, presentation system 300 begins presenting an alternate content ad, such as described with respect to FIG. 4. In other embodiments, upon beginning the gesture, presentation system 300 skips to protected segment 340 (shown in FIG. 3) and displays protected segment 340. In the example embodiment, upon filling of progress bar 514, 524, presentation system 300 ceases presentation of the ad.

In some embodiments, visual queue 510, 520 may also include an image 516, such as a brand logo for the advertiser. This image 516, in the example embodiment, is displayed while the gesture is begin performed by user 302. Advertiser may provide image 516 and associate image 516 with particular ads. As such, presentation system 300 enables the advertiser to provide additional brand messaging to user 302 in lieu of, for example, transmitting an entire advertisement to computing device 304.

In some embodiments, presentation system 300 presents a streaming media environment such as live stream video, and provides an ad simultaneously with the live stream video. For example, prior to beginning presentation of an ad, the live stream video occupies a primary display area 530. At the beginning of display of an ad, presentation system 300 may, for example, alter the presentation of the live stream video, such as by presenting the live stream video in a small window 532 within primary display area 530 (e.g., picture in picture) and displaying the ad in primary display area 530. In some embodiments, the same gesture mechanics as described above may be performed by user 302 and presentation system 300, and conclusion of display of the ad causes the live stream video to shift back to primary display area 530. In other embodiments, filling progress bar 514, 524 causes the live stream video to shift back to primary display area 530.

In some embodiments, presentation system 300 presents a live audio stream, such as a live radio station stream that does not include video. The live audio stream may be presented to user 302 through, for example, an audio output device (e.g., a speaker) of computing device 304. When user 302 begins the gesture, an audio ad and/or a video ad (with or without audio) may be presented to user 302 (e.g., using the speaker and/or primary display area 530). To continue presenting the live audio stream to user 302 in some form, in some embodiments, presentation system 300 may provide subtitles and/or closed captioning of the live audio stream to user 302 in small window 532, or as a marquee within primary display area 530. In other embodiments, presentation system 300 may continue to present the live audio stream to user 302 (e.g., via the speaker), and presentation system 300 may also simultaneously present a video-only ad to user 302 (e.g., in primary display area 530).

Figure 6:
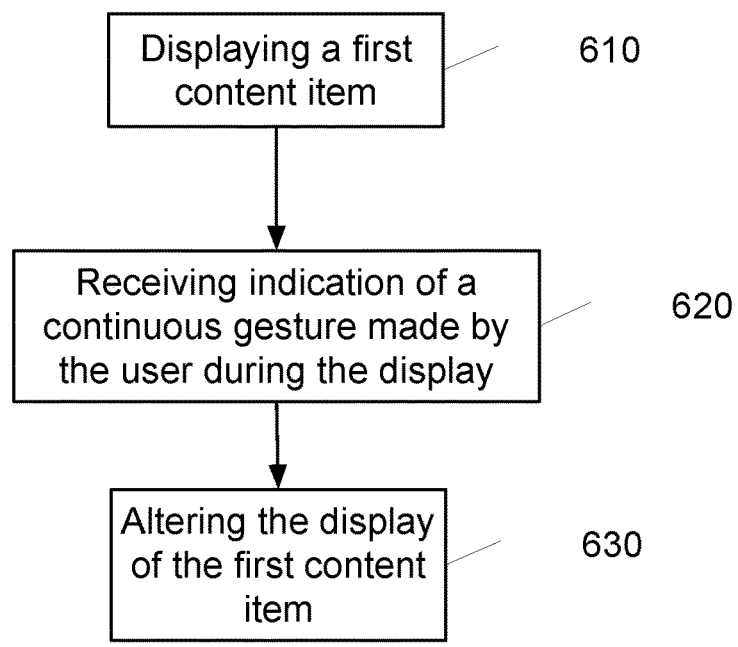

FIG. 6 is an example method 600 for serving online content that facilitates controlling network usage during presentation of content items to users. In the example embodiment, method 600 is a computer-implemented method practiced in environment 100 (shown in FIG. 1) using one or more computing devices such as user access devices 108 (shown in FIG. 1), ad serving system 120 (shown in FIG. 1), backend servers 118 (shown in FIG. 1), content provider system 112 (shown in FIG. 1), publisher system 114, and/or computing device 304 (shown in FIGS. 3-5), and includes at least one processor and a memory.

In the example embodiment, method 600 includes displaying 610 a first content item to the user through the display device. Method 600 also includes receiving 620 an indication of a continuous gesture made by the user using the input device during the display of the first content item. Method 600 further includes altering 630 the display of the first content item based at least in part on the indication of the continuous gesture.

In some embodiments, altering 630 includes displaying a first portion of the first content item at a speed greater than a normal speed while the continuous gesture is made by the user, and displaying a second portion of the first content item at the normal speed regardless of whether or not the continuous gesture continues to be made by the user. In some embodiments, altering 630 includes halting display of the first content item upon receiving indication of the continuous gesture, and displaying a second content item instead of the first content item while the continuous gesture is made by the user. In some embodiments, altering 630 includes displaying a progress bar during the continuous gesture for a pre-determined amount of time, and altering the pre-determined amount of time of the continuous gesture has elapsed, halt the display the first content item.

In some embodiments, method 600 also includes displaying a button to the user through the display device, and the continuous gesture includes the user pressing and holding the button. In some embodiments, method 600 includes displaying a primary content item simultaneously with display of the first content item, wherein the first content item is contained within a first display area on the display device and the primary content item is contained in a second display area within the first display area. In some embodiments, the primary content item includes a first audio aspect, the first content item includes a second audio aspect, and altering 630 the display of the first content item further includes muting one of the first audio aspect and the second audio aspect during the continuous gesture. Further, in some embodiments, altering 630 also includes providing subtitle text of the muted one of the first audio aspect and the second audio aspect during the continuous gesture.

Figure 7:
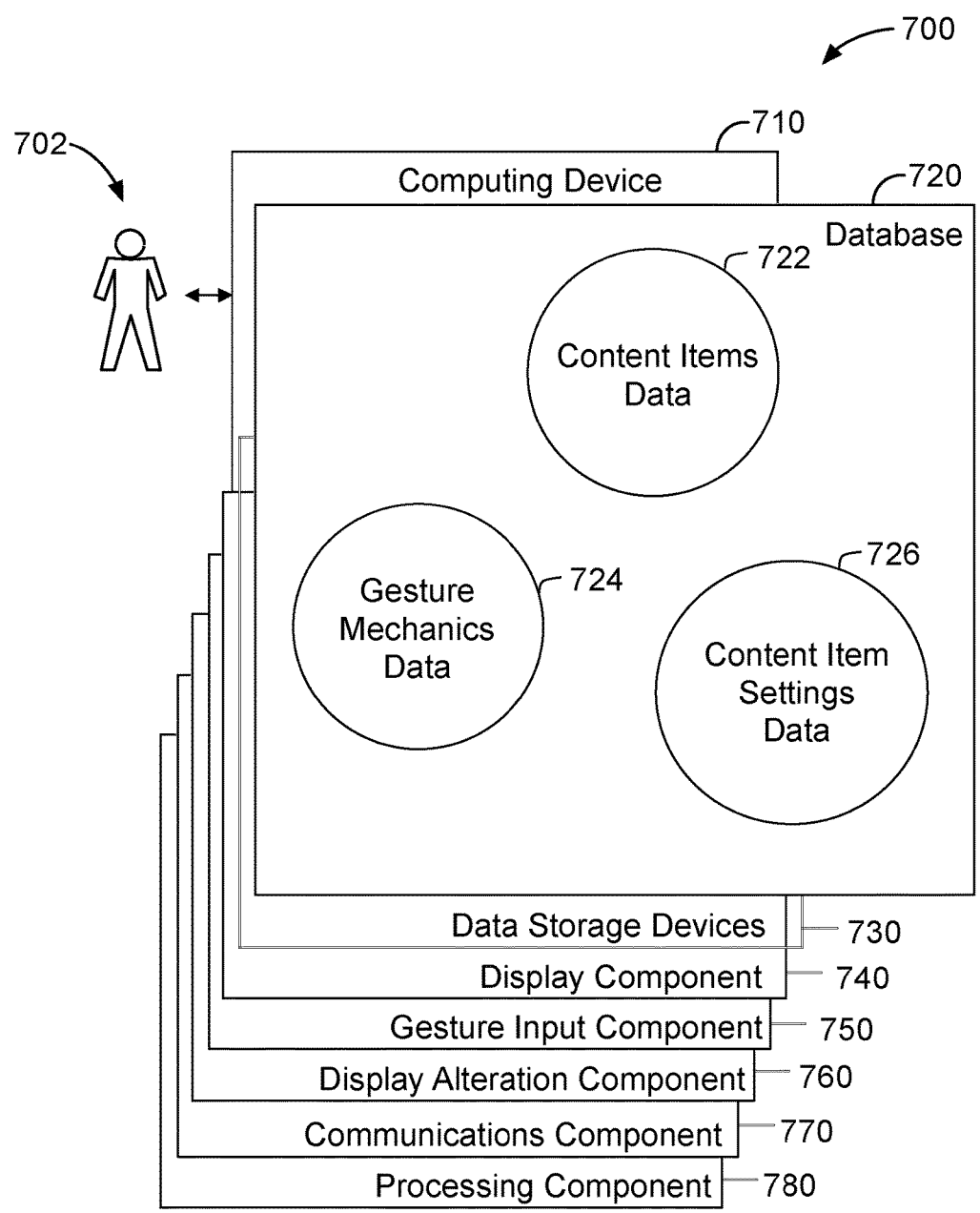

FIG. 7 shows an example configuration 700 of a database 720 within a computing device 710, along with other related computing components, that may be used for controlling network usage during presentation of content items to users. Computing device 710 may operate in a networked environment such as environment 100 (shown in FIG. 1). In some embodiments, computing device 710 is similar to user access devices 108 (shown in FIG. 1), CMS 106 (shown in FIG. 1), ad serving system 120 (shown in FIG. 1), content provider system 112 (shown in FIG. 1), publisher system 114, and/or computing device 304 (shown in FIGS. 3-5). Database 720 is coupled to several separate components within computing device 710, which perform specific tasks.

In the example embodiment, database 720 includes content items data 722, gesture mechanics data 724, and content item settings data 726. Content items data 622 includes information associated with content items that may be displayed to user 702, such as audio content items and video content items with audio components. Gesture mechanics data 724 includes information associated with gestures that may be performed by user 702 on computing device 710. Content item settings data 726 includes data associated with settings for content items, such as protected and unprotected sections data, time marks, progress bar timers, and alternate content item identifiers.

Computing device 710 includes the database 720, as well as data storage devices 730. Computing device 710 also includes a display component 740 for presenting content items to user 702. Computing device 710 also includes a gesture input component 750 for identifying when user 702 has performed particular gestures. Computing device 710 also includes a display alteration component 760 for altering the display of content items based on gestures made by user 702. A communications component 770 is also included for communicating with other servers or entities that facilitates content presentation to user 702. A processing component 780 assists with execution of computer-executable instructions associated with the system.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the embodiments or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" "retrieving" "receiving" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

While the disclosure has been described in terms of various specific embodiments, it will be recognized that the disclosure can be practiced with modification within the spirit and scope of the claims.

What is claimed is:

1. A user computing device for content presentation to a user, the user computing device comprising:
    an interactive surface including an input device configured to generate an indication of a gesture when performed by the user and a display device configured to provide content presentation to the user; and
    at least one processor configured to:
        display a first content item to the user via the display device;
        receive, during the display of the first content item, an indication of a continuous gesture made by the user using the input device;
        display, responsive to receipt of the indication of the continuous gesture, a progress bar having a predetermined duration;
        display, responsive to receipt of the indication of the continuous gesture, a first portion of the first content item at a speed greater than a normal speed while the continuous gesture is made by the user, and a second portion of the first content item at the normal speed regardless of whether or not the continuous gesture continues to be made by the user;
        determine whether the indication of the continuous gesture has been continuously received for the predetermined duration; and
        if the indication of the continuous gesture has been continuously received for the predetermined duration, halting the display of the first content item, and
        if the indication of the continuous gesture has ended before expiration of the predetermined duration, halting the display of the progress bar and continuing display of the first content item.

2. The user computing device of claim 1, wherein the progress bar identifies a pre-determined amount of time for which the continuous gesture is to be made.

3. The user computing device of claim 1, wherein the at least one processor is further configured to display a button to the user through the display device, wherein the continuous gesture includes the user pressing and holding the button.

4. The user computing device of claim 1, wherein the at least one processor is further configured to display a primary content item simultaneously with display of the first content item, wherein the first content item is contained within a first display area on the display device and the primary content item is contained in a second display area within the first display area.

5. The user computing device of claim 4, wherein the primary content item includes a first audio aspect, wherein the first content item includes a second audio aspect, wherein the at least one processor is further configured to mute one of the first audio aspect and the second audio aspect during the continuous gesture.

6. The user computing device of claim 5, wherein the at least one processor is further configured to provide subtitle text of the muted one of the first audio aspect and the second audio aspect during the continuous gesture.

7. A computer-implemented method for controlling network usage associated with content presentation to a user, said method using a computing device including a processor, a display device, and an input device, said method comprising:
   displaying a first portion of a first content item to the user through the display device;
   during display of the first portion of the first content item, receiving an indication of a continuous gesture made by the user using the input device;
   displaying, responsive to and while the indication is received and during display of the first portion of the first content item, a progress bar having a predetermined duration;
   displaying, responsive to receipt of the indication of the continuous gesture, a first portion of the first content item at a speed greater than a normal speed while the continuous gesture is made by the user, and a second portion of the first content item at the normal speed regardless of whether or not the continuous gesture continues to be made by the user; and
   determining whether the indication is received for the predetermined duration; and
   if the indication has been received for the predetermined duration, halting display of the first content item and displaying a subsequent third portion of the first content item regardless of whether or not the continuous gesture continues to be made by the user, and if the indication has not been received for the predetermined duration, halting the display of the progress bar and continuing display of the first content item.

8. The method of claim 7 further comprising displaying a button to the user through the display device, wherein the continuous gesture includes the user pressing and holding the button.

9. The method of claim 7 further comprising displaying a primary content item simultaneously with display of the first content item, wherein the first content item is contained within a first display area on the display device and the primary content item is contained in a second display area within the first display area.

10. The method of claim 9, wherein the primary content item includes a first audio aspect, wherein the first content item includes a second audio aspect, wherein altering the display of the first content item further includes muting one of the first audio aspect and the second audio aspect during the continuous gesture.

11. The method of claim 10, wherein altering the display of the first content item further includes providing subtitle text of the muted one of the first audio aspect and the second audio aspect during the continuous gesture.

12. A method, comprising:
   displaying, via a display of a computing device, a first item of content;
   detecting, via an input device of the computing device, an interaction of a user comprising a continuous gesture;
   displaying, via the display and responsive to detecting the interaction of the user, a progress bar;
   filling the progress bar while continuing display of the first item of content, responsive to continued detection of the interaction of the user;
   displaying, responsive to detecting the interaction of the user, a first portion of the first item of content at a speed greater than a normal speed while the interaction is made by the user, and a second portion of the first item of content at the normal speed regardless of whether or not the interaction continues to be made by the user;
   determining whether the interaction is continuously detected for a predetermined time period; and
   if the interaction of the user is continuously detected for the predetermined time period, halting display of the first item of content and the progress bar, and if detection of the interaction of the user ends before expiration of the predetermined time period, halting display of the progress bar and continuing display of the first item of content.

13. The method of claim 12, wherein the interaction of the user comprises a continuous gesture.

14. The method of claim 12, further comprising:
   responsive to continued detection of the interaction of the user for the predetermined time period, displaying a second item of content.

* * * * *